March 10, 1942.  I. B. HOROWITZ  2,276,258
AUTOMOTIVE TRANSMISSION
Filed Feb. 16, 1940  8 Sheets-Sheet 5
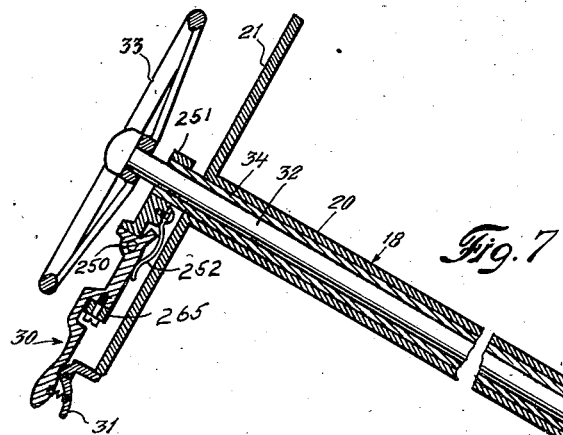
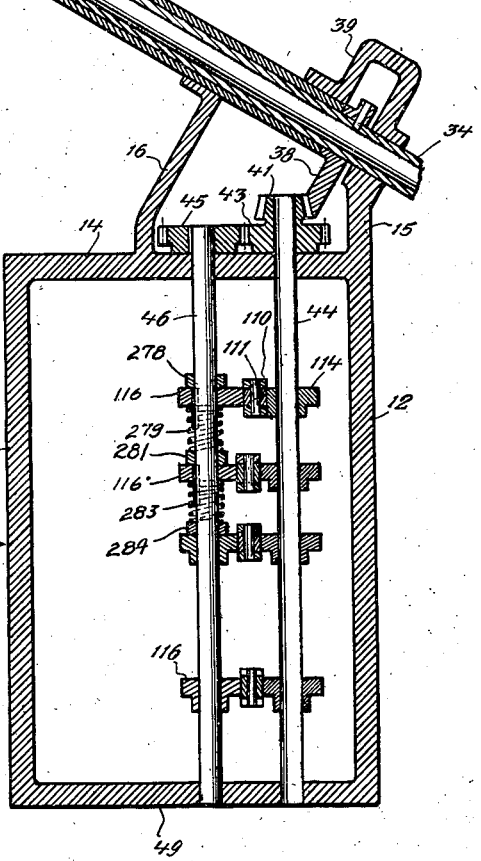
INVENTOR.
ISAAC B. HOROWITZ
BY John P. Chandler
his ATTORNEY.

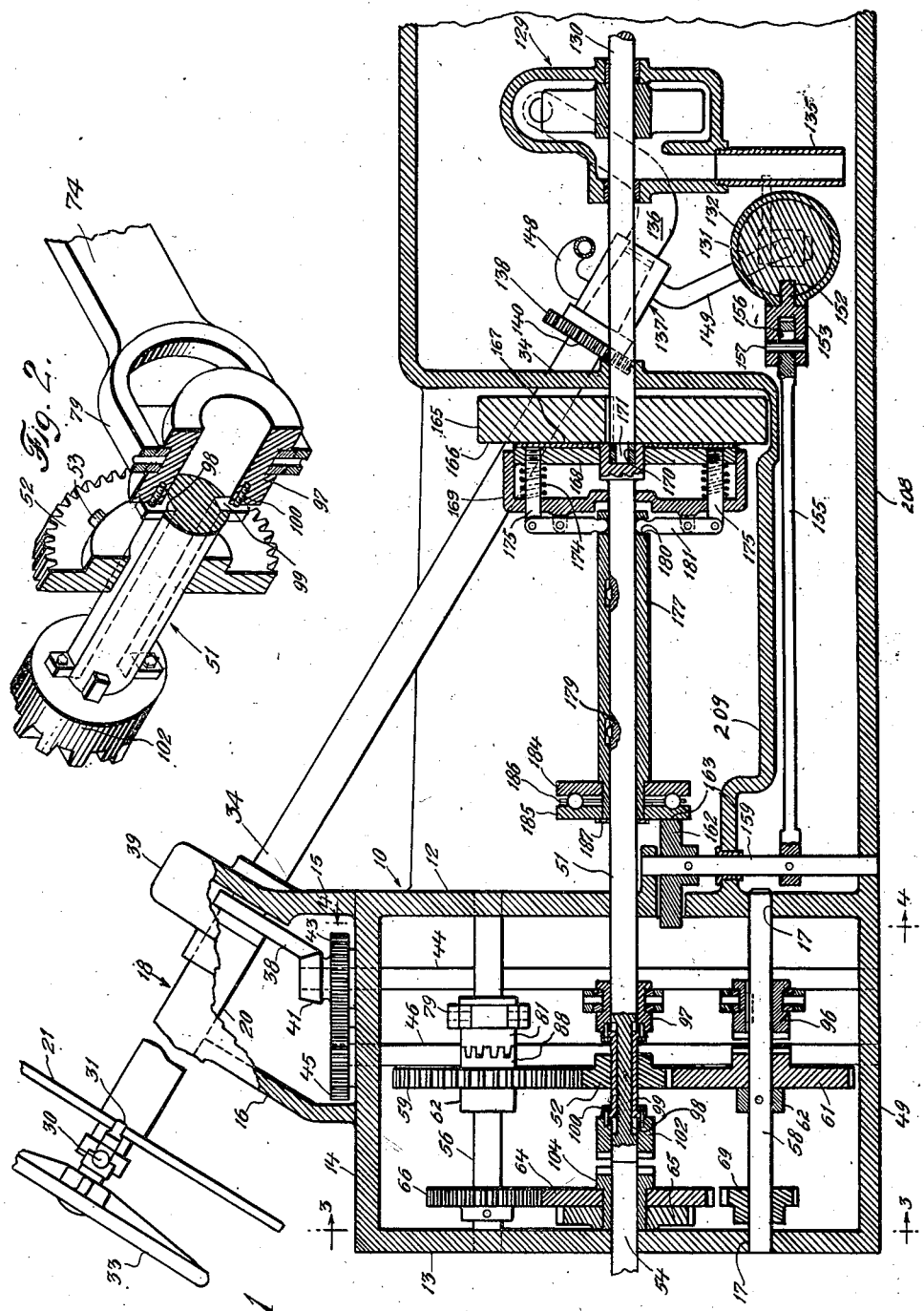

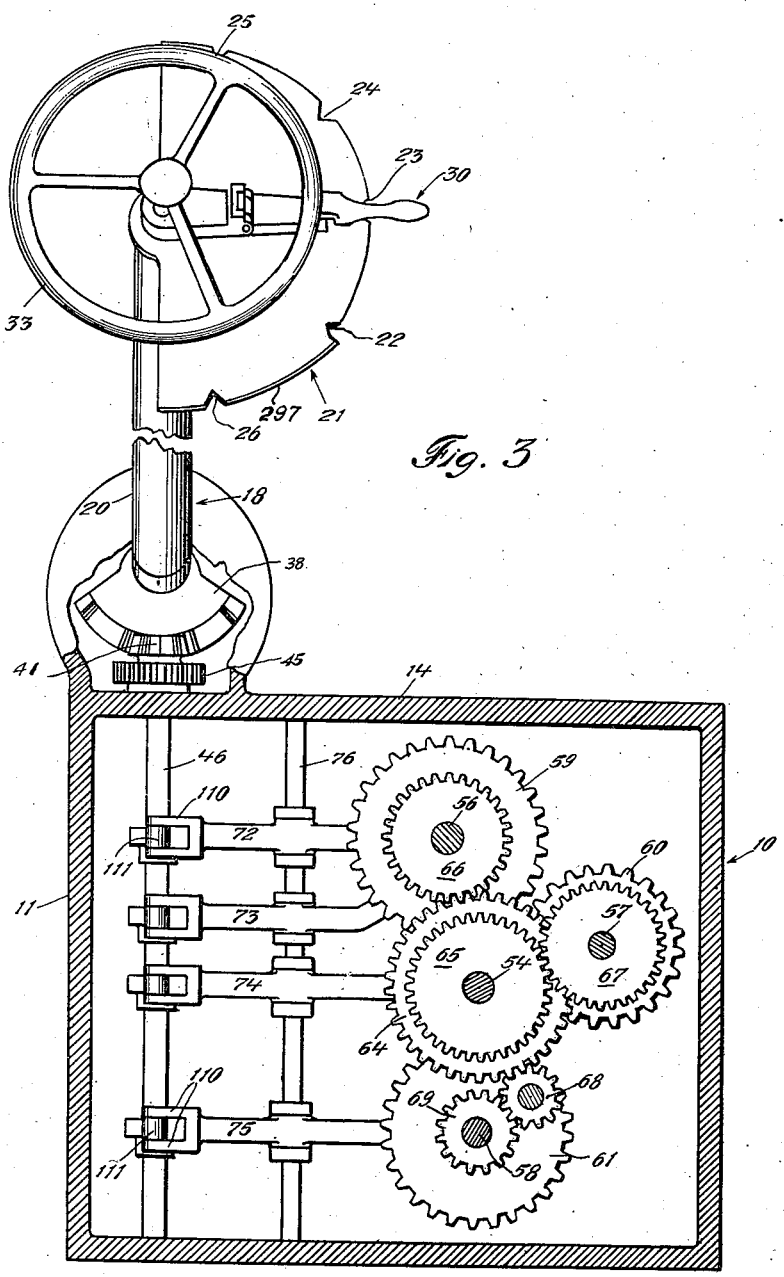

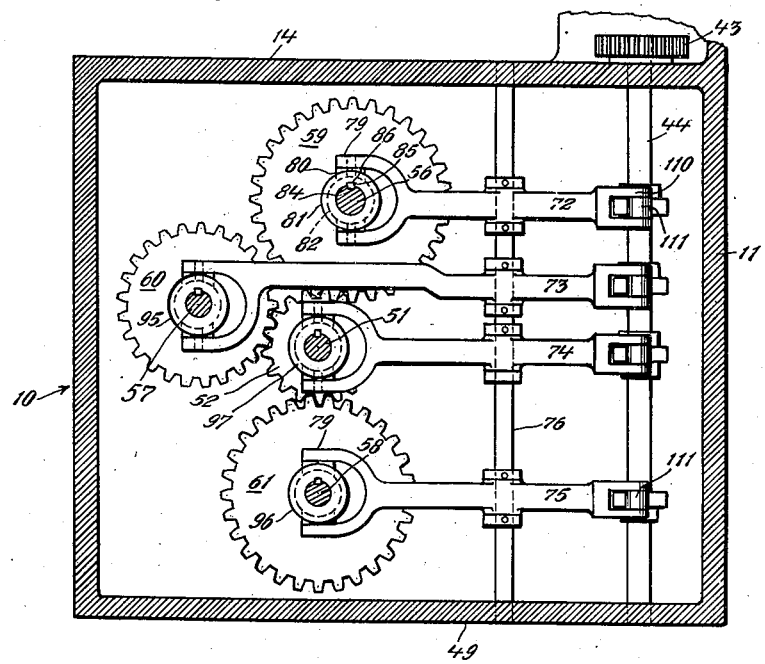

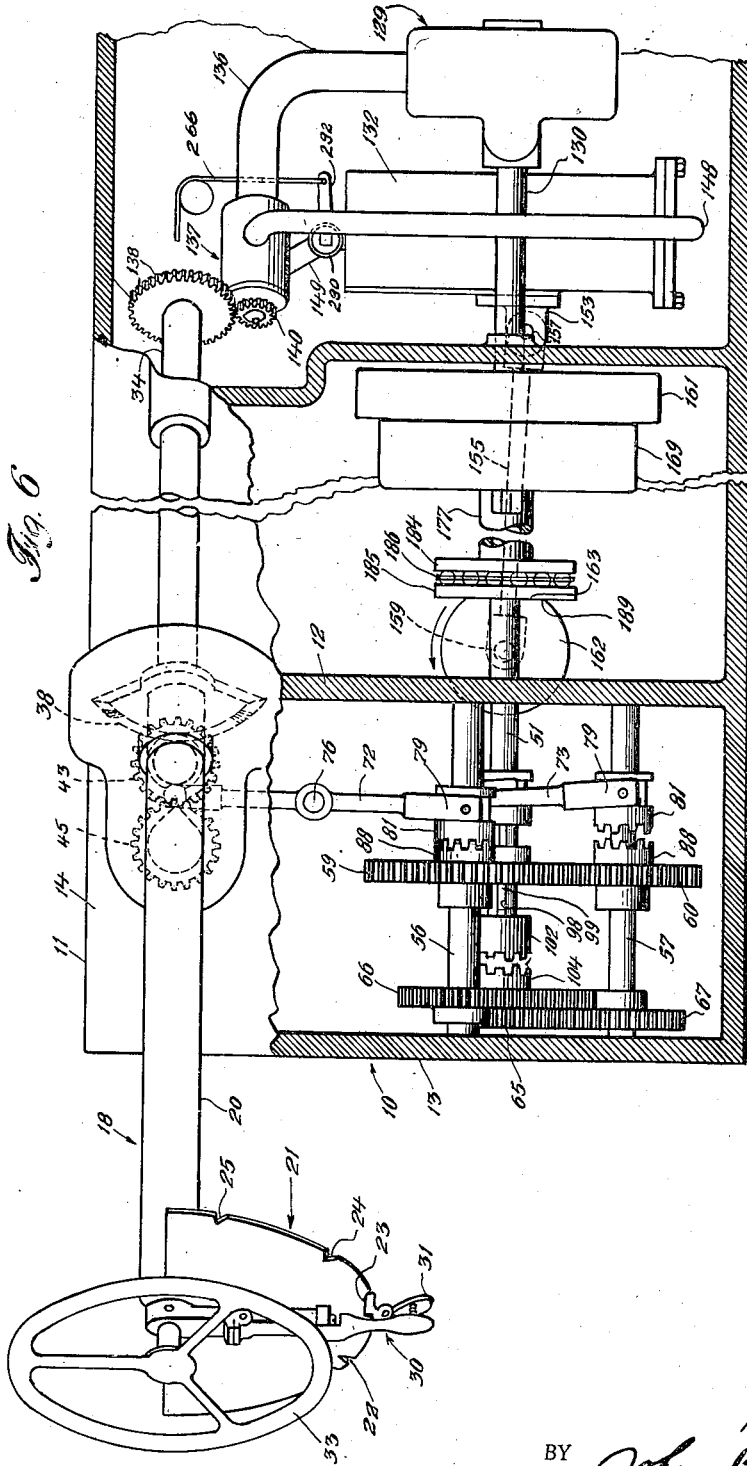

March 10, 1942.    I. B. HOROWITZ    2,276,258
AUTOMOTIVE TRANSMISSION
Filed Feb. 16, 1940    8 Sheets-Sheet 6
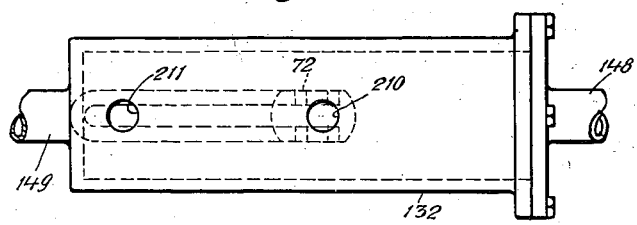
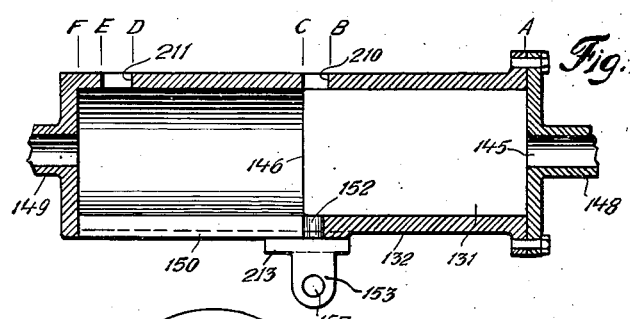
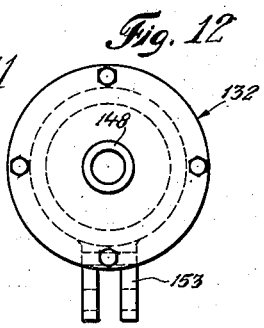
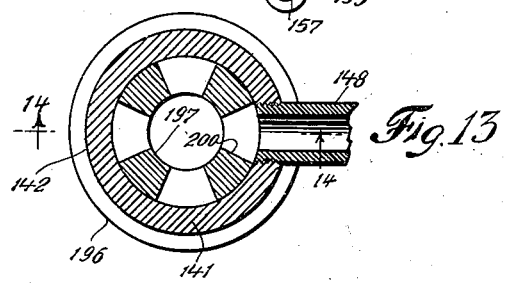
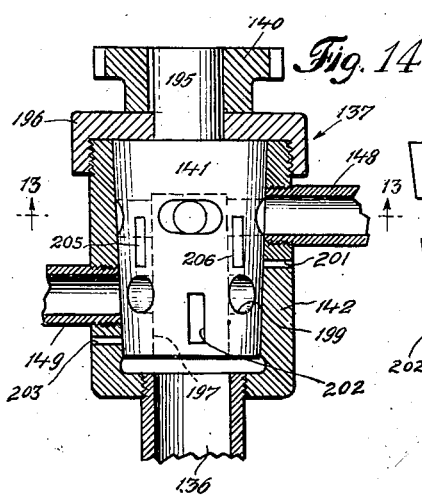
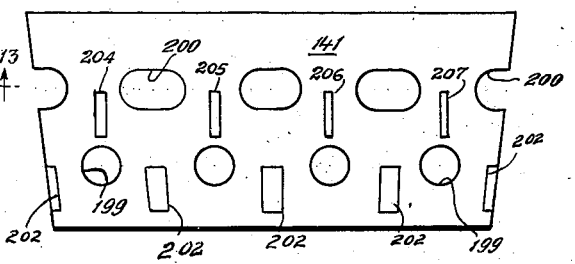
INVENTOR.
ISAAC B. HOROWITZ
BY John P. Chandler
his ATTORNEY.

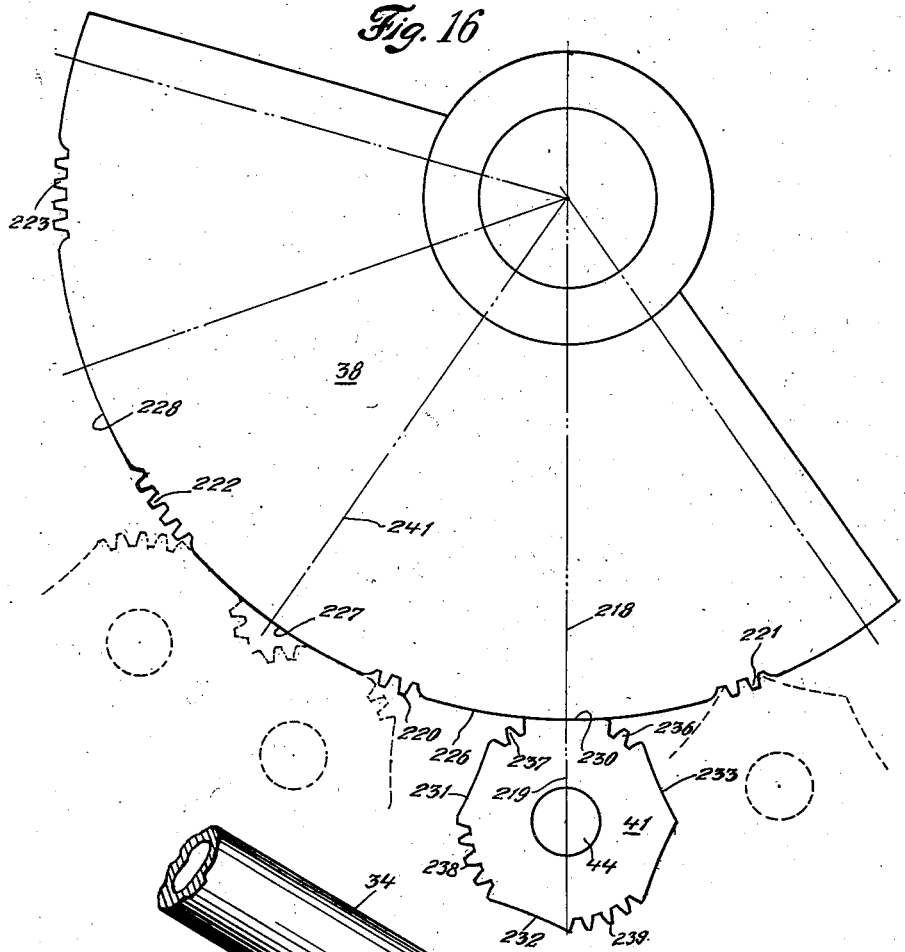
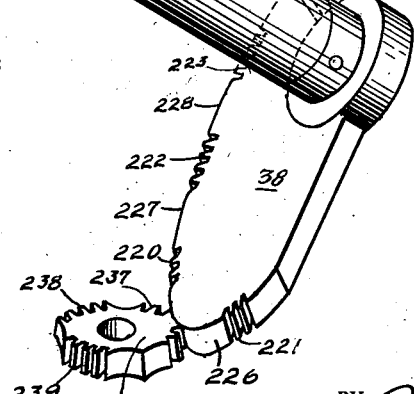

March 10, 1942.  I. B. HOROWITZ  2,276,258
AUTOMOTIVE TRANSMISSION
Filed Feb. 16, 1940  8 Sheets-Sheet 8
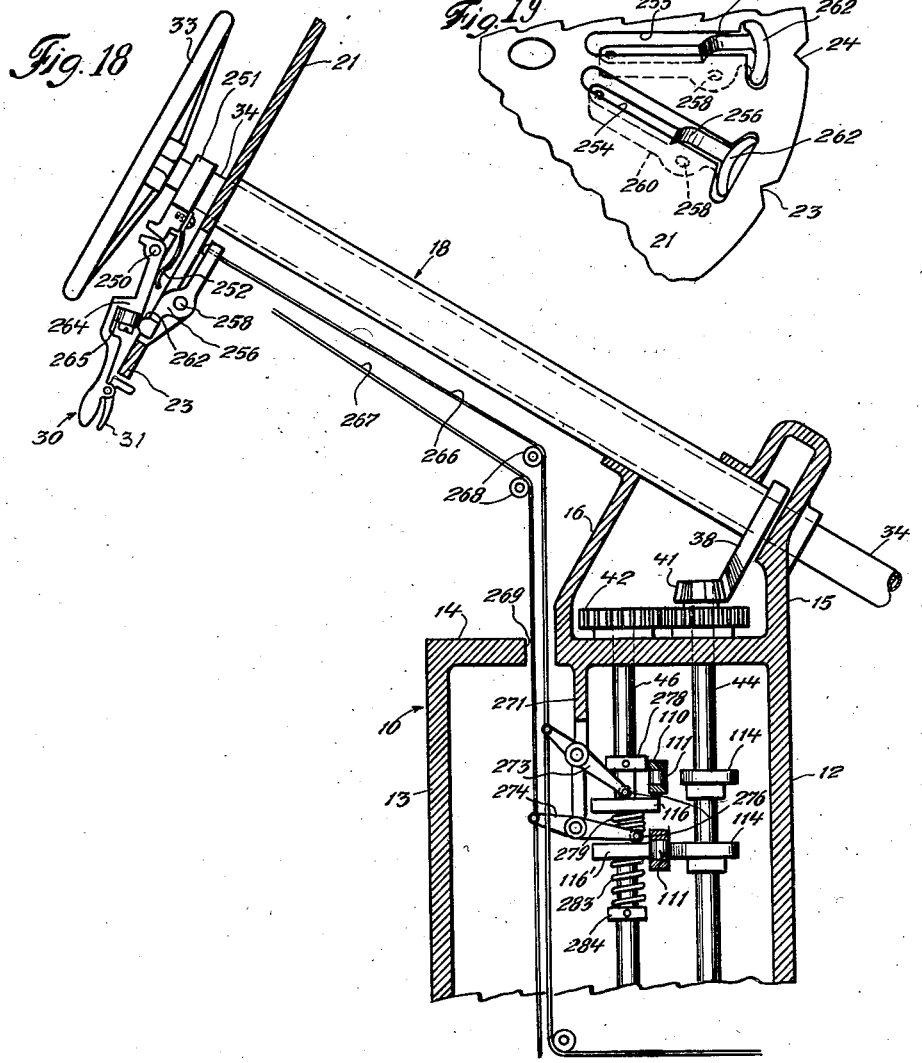
INVENTOR.
ISAAC B. HOROWITZ
BY John P. Chandler
his ATTORNEY.

Patented Mar. 10, 1942

2,276,258

UNITED STATES PATENT OFFICE 2,276,258

AUTOMOTIVE TRANSMISSION

Isaac B. Horowitz, New York, N. Y.

Application February 16, 1940, Serial No. 319,323

19 Claims. (Cl. 192—3.5)

This invention relates to new and useful improvements in power transmission devices and relates more especially to a speed changing mechanism particularly adapted for motor vehicles.

One of the principal objects of the invention is to provide a device of this character wherein the change of gear ratio between driving and driven shaft, as well as disengaging of the clutch prior to such change and the re-engaging of such clutch after the change, are brought about by manual actuation of a single lever positioned within easy access of the operator.

In its preferred embodiment, the control lever is mounted on a shaft carried concentrically of the shaft carrying the steering wheel, the control lever being positioned adjacent to such steering wheel. A fixed dial is associated with such lever, the dial having a plurality of spaced recesses engaged by suitable stop means carried by the lever, to indicate the position of the lever for the several speeds. As the lever is moved from neutral position to that of first speed, such movement sets in motion suitable mechanism for successively disengaging the clutch, engaging the proper gearing for first speed and re-engaging the clutch. In moving the lever from first to second speed positions, the clutch is again disengaged, first speed gearing disengaged and second speed gearing engaged, and the clutch is re-engaged as aforesaid.

It is accordingly another object of the invention to provide a semi-automatic power transmission device for vehicles and the like wherein the change from one speed to another is effected with a minimum expenditure of effort by the operator and yet wherein the several operations are manually controlled.

Another object of the invention is to provide semi-automatic power transmission device wherein the operator is completely relieved of the necessity of disengaging the clutch by depressing a foot pedal, thus avoiding the physical strain which accompanies constant foot actuation of the clutch. If desired, of course, an auxiliary foot operated clutch may be provided, although it would in all events never be used because the clutch actuating means are such as to have a small likelihood of getting out of order.

Another object of the invention is the provision of a speed changing mechanism having means for either a progressive or a selective transmission, the aim of the invention being to simplify and improve the mechanism for multiple speed power transmission and to accomplish the change from speed to speed without noise or appreciable shock.

In the drawings:

Fig. 1 is a longitudinal vertical section taken through substantially the center of the preferred embodiment of the present invention;

Fig. 2 is a perspective view, partially in section, of a portion of the main drive of the device;

Fig. 3 is a transverse vertical section taken on line 3—3 of Fig. 1, the view also showing the manual control mechanism associated with the steering apparatus;

Fig. 4 is a transverse vertical section taken on line 4—4 of Fig. 1;

Fig. 5 is a broken top plan view of a portion of the device, the view showing the arrangement of one of the shifting levers, the cams operating the same, and the toothed clutch member actuated by the lever;

Fig 6 is a top plan view of the apparatus, a portion of the casing being in section to show certain internal parts of the device;

Fig. 7 is a broken vertical section taken through the steering wheel and a portion of the casing housing the mechanism, such view showing the cam arrangement for operating the shift levers;

Fig. 8 is a perspective view of the several shifting levers and the cam means for actuating the same;

Fig. 9 is a perspective view showing a modified form of lever-shifting structure employing a single rather than a double cam;

Fig. 10 is a front elevation of the cylinder which operates the clutch control mechanism;

Fig. 11 is a horizontal section taken through the center of this cylinder;

Fig. 12 is an end elevation of the cylinder;

Fig. 13 is a transverse horizontal section taken through the valve structure which controls the movement of the fluid used for actuating the piston within the cylinder shown in Fig. 10, such section being on line 13—13 of Fig. 14;

Fig. 14 is a transverse vertical section taken through the valve structure, the section being taken on line 14—14 of Fig. 13, the rotary valve member being shown in elevation;

Fig. 15 is a developed view of the rotary valve structure;

Fig. 16 is a diagrammatic view of the Geneva type gears employed for operating the clutch control mechanism;

Figure 17 is a perspective view of the structure shown in Fig. 16;

Fig. 18 is a side elevation of the steering apparatus, the view showing in section the alternative means for employing the transmission either as a progressive or as a selective system;

Fig. 19 is a perspective view of a portion of the dial showing part of the means employed for a selective transmission.

Referring now more particularly to the drawings, Fig. 1 shows the general relationship of most of the operative parts of the device, the gearing being positioned within a substantially rectangular housing 10, the left side wall of which occupies a position just to the left of the steering apparatus 18, as shown in Fig. 3. The front and rear end walls 12 and 13, respectively, have a plurality of pairs of suitably placed aligned apertures 17 therein which serve as journals for various of the shafts positioned within such housing, the rear wall 13 being positioned in the automobile sufficiently forward of the steering wheel as not to interfere with the proper steering of the car.

The upper wall 14 of the casing may be positioned somewhat above the floor (not shown) of the car and such upper wall is provided with a gear housing having walls 15 and 16, respectively, such housing supporting the steering apparatus, which is designated generally by the reference numeral 18. The steering apparatus is shown more in detail in Fig. 7 and includes an outer fixed sleeve 20 which supports a substantially semi-circular dial 21 which is provided with a plurality of spaced notches designated as 22, 23, 24, 25 and 26, respectively. A control lever 30 having a hinged, spring-pressed bell crank stop member 31 is manually actuated by the driver, the stop member engaging one of such notches. When such stop member is engaging notch 22, the gear mechanism is in neutral position. Notches 23, 24 and 25, respectively, are for first, second and third speeds, and notch 26 is for reverse.

The steering apparatus further includes a central shaft 32 which carries the steering wheel 33 at the upper end thereof and an independently rotatable sleeve 34 carried concentrically of the shaft 32, the control lever 30 being keyed to such sleeve or hollow shaft 34 at the upper end thereof.

A segmental bevelled gear 38 of special construction, which will be described more in detail hereinafter, is keyed to sleeve 34 just above wall 15 of the housing, such housing having at its upper end an extension portion 39. Gear 38 engages another special gear 41 which is secured to a conventional gear 43, both of which gears are keyed to a vertical shaft 44, gear 43 engaging another gear 45 keyed to a second vertical shaft 46 both of which are journalled in the upper wall 14 and the lower wall 49, respectively, of the casing 10. The main drive shaft, designated as 51, is journalled adjacent to its rear end in the front wall 12 of housing 10, such shaft carrying adjacent to its rearward end a master driving gear 52 which is keyed thereto by any suitable means such as a set screw 53, the inner end of which is received in a shallow aperture (not shown) in shaft 51. A main driven shaft 54 is journalled in rear wall 13 in alignment with the main drive shaft 51 and at points spaced from aligned shafts 51 and 54, are a plurality of countershafts 56, 57 and 58, such shafts carrying gears 59, 60 and 61, respectively, which are freely mounted thereon, such gears being continuously engaged and adapted to be rotated by master driving gear 52.

Countershafts 56 and 57 are employed in connection with first and second forward speeds and countershaft 58 with reverse drive. Driven shaft 54 carries gears 64 and 65 which are keyed thereto. These gears are not carried directly on shaft 54 but are carried on a sleeve portion of a clutch member 104 keyed to shaft 54. Any suitable key arrangement for causing all four elements to turn together may be employed. Gear 64 is in constant mesh with a gear 66 keyed to shaft 56 while gear 65 is in constant mesh with a gear 67 keyed to shaft 57. Gear 64 is also in constant mesh with a small gear 68 associated with reverse drive, such gear 68 also being in constant mesh with a gear 69 keyed to shaft 58.

It was earlier pointed out that gears 59, 60 and 61 are freely mounted on their shafts 56, 57 and 58, respectively. They are restrained from longitudinal movement on such shafts by conventional means 62. The following clutch means are provided to selectively key one or the other of such gears to its respective shaft. Levers 72, 73, 74 and 75 respectively are freely pivoted at points between their terminals on a vertical shaft 76. These levers are of varying lengths, as shown in Fig. 4, since they actuate clutches on shafts 56, 57, 51 and 58, respectively, such shafts being positioned at varying distances from vertical shaft 76. Inasmuch as the clutch structures in all shafts except shaft 51 are substantially similar, only one will be described in detail. Each lever at its inner end is bifurcated as shown at 79, the inner surfaces of such portions supporting bearing blocks 80 (Fig. 8).

The clutch member 81, shown in some detail in Fig. 5, is formed with an annular recess 82 which receives the bearing blocks 80, thus permitting the clutch member to rotate freely between the blocks. Shaft 56 is formed with a longitudinal recess 84 (Fig. 4) and a key 85 is secured therein. The central aperture in the clutch member 81 is also formed with a longitudinal recess 86 to receive the key. Thus clutch member 81 rotates with shaft 56. Another clutch member 88 is carried by freely rotating gear 59 and as movable clutch member 81 is moved into engagement with clutch member 88, gear 59, which is driven by master drive gear 52, causes shaft 56 to rotate. In turn, gear 66 carried thereby rotates gear 64 keyed to main driven shaft 54.

It will be noted that clutch member 81 and 88 are provided with alternate short and long teeth 92 and 93, respectively. The teeth are formed in this fashion in order that the engaging thereof may take place smoothly and without clashing. This arrangement has the advantage of presenting large spaces which accommodate the long teeth swiftly. Also, as the teeth become fully engaged no backlashing is possible. These clutch members may be modified in any manner known in the art to cause them to be brought together without clashing.

The clutch 95 (Fig. 4) carried by shaft 57 for intermediate forward speed, and actuated by lever 73, and the clutch 96 carried by shaft 58 for reverse, and actuated by lever 75, operate in the same fashion as the one just described. Clutch means for third speed forward, illustrated in Fig. 2, is slightly different in that it merely effects a direct connection between main drive shaft 51 and main driven shaft 54, and includes a slidable sleeve 97. Shaft 51 is formed with opposed longitudinal recesses 98 (Figs. 1 and 2) and longitudinally movable keys 99 positioned therein are secured at one end thereof to sleeve 97 by means of screws 100. It will be appreciated that main drive gear 52 keyed to shaft 51 by set screw 53 at this point is not interfered with by keys 99. At their opposite ends the keys 99 are secured to clutch member 102 which, when sleeve 97 is moved by lever 74, engages clutch member 104 keyed to driven shaft 54. If desired, the structure shown in Fig. 2 could be dispensed with by providing an offset lever in place of lever 74.

Now to return to levers 72 to 75 and the means for actuating them to cause the respective clutch members carried at their inner ends to be moved on their shafts, it was pointed out earlier that manipulation of control lever 30 by the operator caused special gear 38 which is in the nature of an intermittent or Geneva driving gear, to move special gear 41, the latter turning shaft 44, as well as shaft 46 through the interposition of gears 43 and 45 (Fig. 1). The means for actuating the individual clutch levers through said shafts 44 and 46 will now be described. At their opposite ends levers 72 to 75 are also bifurcated as shown at 110 and a roller 111 is pivotally mounted between the terminals of such bifurcated portions.

Shaft 44 carries a plurality of spaced, circular cams 114, each having a recess 115 therein, such cams carried by shaft 44 being hereinafter referred to as the "female" cams. Shaft 46 carries a plurality of spaced cams 116 having a male portion 117, which cams will be hereinafter referred to as the "male" cams. This general arrangement is shown in Fig. 5 and it will be apparent that as shafts 44 and 46 are given a partial turn, the male portion 117 of cam 116 moves roller 111 carried between the bifurcated portion 110 of lever 72 into the recess 115 in cam 114, thus moving lever 72 in a clockwise direction when viewed in Fig. 5 sufficiently to move clutch 81 into engagement with clutch 88, thus keying constantly rotating gear 59 to shaft 56. It will further be apparent that as the shafts 44 and 46 are again given a slight turn the roller 111 will be forced out of female portions 115 and the lever will once again assume the position shown in Fig. 5.

A general view of the four sets of male and female cams 116 and 114, respectively, mounted on shafts 46 and 44, is shown in Fig. 8 and it will be noted that the several cam portions occupy different positions in their relation to one another on their respective shafts in order to successively actuate the several levers as shafts 44 and 46 are intermittently rotated. Thus movement of lever 30 on steering apparatus produces a progressive transmission and means will be described hereinafter for actuating the transmission as a selective one.

A slight modification in this cam arrangement is illustrated in Fig. 9 wherein instead of providing two shafts 44 and 46 for operating the cams, a single shaft 44' is employed, such shaft carrying a cam 121 having a male portion or projection 122 and, on its opposite side, a recess or female portion 123. In this instance the lever 72 is formed with a horizontal bifurcated portion 124 carrying a roller 125 at each end thereof for engaging male and female portions 122 and 123 respectively.

The foregoing description has related to the speed ratio transmission portion of the device and attention will now be given to the mechanism for operating the clutch. A centrifugal pump 129, mounted in the crankcase and desirably actuated by crankshaft 130, operates piston 131 within cylinder 132, also located in the crankcase. Oil from this crankcase, or any other suitable source, entering said pump 129 through duct 135 is delivered through duct 136 into valve 137.

This valve is under the control of the operator through hand lever 30 mounted on sleeve or hollow shaft 34. At the lower end of this hollow shaft a gear 138 is secured (Fig. 6), such gear engaging a gear 140 carried by rotary valve member 141 mounted within valve casing 142. This valve directs the oil against right hand terminal or face 145 or left hand terminal or face 146 of piston 131 within cylinder 132 (Fig. 11), depending upon the position of valve member 141 relative to the ports or ducts in casing 142 (Fig. 14). As the fluid is directed against face 145 of piston through duct 148 this piston is forced to move to the left, and, likewise, as the oil enters cylinder through duct 149 and hits left face 146 of the piston it moves to the right. The cylinder 132 is formed with a longitudinal slot 150 at the left side thereof, such slot extending half the length of the cylinder. A pin 152 passes through this slot and into the piston 131, the pin carrying a U-shaped or bifurcated bracket 153 at its opposite end, such bracket, of course, being on the exterior of the cylinder (Fig. 1). An elongated shaft 155 is provided at one end thereof with a slot 156 through which a pin 157 secured to the bracket 153 passes, the slot 156 being of sufficient length to permit some longitudinal variation in the relation between shaft 155 and bracket 153 during the movements of these members.

At its opposite end shaft 155 keyed to a short vertical pin or shaft 159 whose axis is in the same vertical plane as the axis of main drive shaft 51. Thus it will be seen that as piston 131 travels from end to end in cylinder 132 the shaft 159 will be given a partial rotation.

Adjacent to its upper end shaft 159 carries a circular cam 162 having a flat surface 163, such cam operating the clutch structure shown particularly in Fig. 1. This structure may be more or less conventional, with a flywheel 165 carried by crank shaft 130 and presenting a considerable surface 166 engaged by friction disc 167 through pressure plate 168, the various parts lodged in a housing 169. It will be noted that this shaft is provided with a recess 170, which receives and forms a bearing for a reduced rear end portion 171 of crankshaft 130. Springs 174 carried concentrically of pins 175 normally maintain friction disc 167 in firm operative engagement with flywheel 165. When, however, the clutch is to be disengaged, an elongated sleeve 177 carried on and being longitudinally movable of, though keyed to main drive shaft 51 by means of conventional keys represented by numeral 179, is moved forward. At its forward end this sleeve is formed with slots 180 which receive one end of centrally pivoted links 181 which are secured to pins 175 at their opposite ends. All of this action, upon forward movement of sleeve 177, is well known. Now as to the means for moving sleeve 177, a thrust bearing comprising a pair of circular discs 184 and 185, separated by ball bearings 186, are carried at the rear end of sleeve 177, disc 184 being keyed thereto by any conventional means, while disc 185 is free to rotate thereon. A flat plate 187 prevents disc 185 from moving too far to the left of its position shown in Fig. 1.

As was stated earlier, when the clutch disc 167 is in engagement with flywheel 165, through influence of springs 174 on pins 175, the flat side 163 of cam 162 engages disc 185 of the thrust bearing. Also in this position shaft 155 occupies a position substantially parallel with crankshaft 130 (Fig. 6). In this position also, piston 131 in cylinder 132 is as shown in Fig. 11. When the clutch is to be thrown out, the valve causes oil or other fluid to pass into cylinder through duct 148, thus moving piston to the opposite end of the cylinder and causing arm 155 as well as cam 162 to turn in a counter-clockwise direction, indicated by the arrow in Fig. 6. Numeral 189 indicates the point on cam 162 where the round surface ends and flat surface 163 begins. This portion of cam 162 which may be slightly rounded, if desired, engages disc 185 and moves the thrust bearing and sleeve 177 forward, thus disengaging the clutch.

Now to return to the valve 137, it will be noted that the oil from the crankcase, or from a separate tank if so desired, is forced by the centrifugal pump 129 through duct 136 to valve casing 142 which contains the rotary valve member 141. This member is desirably slightly frusto-conical in shape and the bore in the casing is similarly shaped. Ducts 149 and 148 enter the casing on opposite sides thereof, the latter being above the former. A short shaft 195 is carried by the rotary valve member, the gear 140 being keyed to the upper end of the shaft. A screw cap 196 seals the casing.

The valve member 141, which is provided with a bore 197 extending upwardly from the lower end thereof, will be best understood by referring to the developed view of such valve member shown in Fig. 15. It will be noted that the member is formed with four spaced apertures or ports 199 adjacent to its lower edge which communicate with duct 149 and with four spaced apertures 200 of somewhat longer size adjacent to the upper end thereof, such aperture comunicating with duct 148, the upper and the lower apertures being unaligned with each other vertically.

When the clutch is to be disengaged the operator moves hand lever 30 and thus the valve member turns to a position wherein one of apertures 200 becomes aligned with duct 148, thus causing oil to enter right side of cylinder 132 and move piston 131 to the left. When the clutch is to be re-engaged the valve member 141 has assumed a position wherein one of the apertures 199 becomes aligned with duct 149. The reason for forming apertures 200 somewhat longer than apertures 199 is that as the oil is directed through duct 148 and against face 145 of the piston, movement of the latter does not begin immediately since the oil has not yet ceased movement through duct 149 and for a split instant at least the two streams tend to neutralize each other. When, however, aperture 199 becomes completely closed to duct 149 the piston is under the influence of oil striking face 145 only and movement of the piston commences to the left. The rotary valve member is, we will assume, still rotating while the piston is moving to the left to disengage the clutch. After the piston has moved to the left to a point wherein the clutch has become disengaged, it is desirable to continue the pressure in order to prevent the clutch from accidentally returning to the "engaged" position through jarring or for other unforseen causes. By properly forming apertures 200, this continuing pressure will retain the piston in "disengaged" position an ample length of time.

Besides the fluid pressure the very shape of cam 162 contributes to keep the clutch in disengaged position during the shifting of the speed-establishing clutches. It is understood that point 189 (Fig. 6) of the cam comes into alignment with the vertical plane passing through the axis of shaft 51 and that the clutch is fully disengaged before piston 131 has reached the extreme left side of cylinder 132; as the piston moves further to the left to complete its stroke cam 162 is given a slight further turn so that its circular part comes in contact with plate 185 of thrust bearing 184—185. This slight further turn of the cam has no actuating influence upon the clutch because all the points on the circular portion are equi-distant from the center, but it results in establishing a stable position for the clutch in its thrown-out position until the return movement of the piston changes the situation.

The reason for forming apertures 200 in valve member 141 somewhat longer arcuately than apertures 199 was mentioned earlier. It will be appreciated, of course, that in addition to the provision of means for getting the cam 162 out of its unstable position while the clutch is disengaged, it is also desirable to continue this flow of oil against the piston. Apertures 199, on the other hand, may be smaller in view of the fact that as one is brought to a position wherein it faces duct 149 for the returning of the clutch to the engaged position, it remains there and the oil may continue to pass therethrough.

The rotary valve member 141 keeps turning while the transmission parts are being shifted, even though the clutch has been disengaged. Means of course, can be provided for imparting intermittent movement for valve 141 and such alternative means will be described.

The relationship of gear 138 to gear 140 should be such as to cause rotary valve member to make a complete revolution by rotating gear 138 about 140°, which, experiment has shown, is the most satisfactory range of movement of hand lever 30.

Referring now to Fig. 11, it will be apparent that after oil under pressure entering through duct 148 has moved piston 131 to the left (disengaged position of clutch), the presence of this oil prevents the piston from returning the clutch too rapidly to the engaged position. This oil cannot escape through aperture 200 as the turning of the valve member has closed this passage. The oil is permitted, however, to escape through narrow openings or bleeders 204 to 207 in valve member 141 positioned in vertical alignment with apertures 199.

Below duct 148 is a small port 201 and the oil from right hand end of cylinder 132 is accordingly permitted to pass through duct 148, through one of the bleeders 204 to 207, and out through this port 201, and thus return to the crankcase. Of the four bleeders, two, namely 206 and 207, are small since they are used for "low" and reverse wherein the clutch must be let in slowly. Bleeders 205 for second and 204 for direct drive are correspondingly larger.

The valve member 141 is also formed with a plurality of spaced bleeders 202 of equal size which are in vertical alignment with apertures 200 and accordingly oil trapped to the left of the piston, after end wall 146 has moved to the left of port 211, passes through duct 149, through one of such bleeders, and out through another port 203 in the wall of housing 142. In Fig. 1, the lower wall 208 of the crankcase is shown as being an extension of lower wall 49 of housing 10. The upper wall 209 of the crankcase encloses the operative parts of the device except the main clutch.

Returning now to the cylinder shown in Figs. 10 and 11 it will be noted that a port 210 is formed adjacent to the center and a port 211 is formed adjacent to, but spaced from, the left end. In order to further illustrate the stroke of this piston, I have indicated several transverse planes by letters A, B, C, D, E and F, planes A and F representing the respective right and left end walls of the piston chamber.

When piston 131 is moved to the left and wall 145 thereof reaches plane B, we will assume that the clutch is fully disengaged. The disc 185 is only engaged by point or area 189 of the cam at this point, however, but as the oil continues to enter the cylinder through duct 148 under a pressure of 25 lbs. or thereabouts, piston 131 will be forced further to the left until the oil finds an escape through port 210 and end wall 145 comes to rest at plane C. This extra movement consequently, will cause the cam 162 to turn to its stable position on its round or high portion. Left end wall 146 of the piston will now be at plane F. The oil which had previously filled the cylinder to the left of the piston will have escaped through port 211, slot 150, and through bleeders 202 connecting with channels 203.

When the piston is forced back to the right, and left wall 146 reaches plane E, the cam will be back to its unstable position and as the oil continues to enter the cylinder through duct 149 the piston moves until left wall 146 passes port 211 at which time the pressure, by escape of oil through this port, is relieved. After passing the critical or unstable position the springs 174 of the clutch begin to assert themselves and, unless checked, will cause the clutch to become re-engaged too rapidly. This movement is checked, however, by the oil trapped in the chamber to the right of the piston. A small quantity of this oil escapes through port 210. The balance of the oil is allowed to escape gradually and in a regulated manner through one of bleeders 204 to 207.

It will be noted that pin 152 connecting the cylinder with shaft 155 passes through elongated slot 150, and in order to prevent the oil from escaping through this slot until the cam 162 has passed its critical point as the piston returns to the right, bracket member 153 is provided with a short extension 213, long enough to seal the slot for a distance equal to that between planes D and F. After the piston has reached a point in its return travel wherein the clutch springs do the work, the oil to the left of wall 146 may escape through port 211 and slot 150.

It is appreciated that valve 137 and cylinder 132 are desirably located in the crankcase wherein the oil there contained is readily accessible to the pump. The structure may, however, be appropriately altered to place these parts out of the crankcase and also some fluid medium other than oil may be used.

It was stated earlier that it was an object of the invention to provide speed changing means wherein the change from one to the other of the forward speeds, and to reverse, including the disengaging of the clutch, could be accomplished by the moving of a single hand lever conveniently placed near the steering apparatus, and accordingly the clutch and transmission were always under the control of the operator.

In changing from one speed to another, there are, of course, three operations, namely, disengaging the clutch, shifting the transmission parts, and finally re-engaging the clutch. In the present invention the second operation is performed by means of the special gears 38 and 41 which produce intermittent though co-ordinated movements, and the first and third operation by means of gear 138 at the lower end of sleeve 34. For ease of operation, the total arcuate movement of hand lever 30 should be 140° or thereabouts.

Referring now to Figs. 3 and 6, assume hand lever 30 is in neutral position opposite notch 22, and the operator desires to put the transmission in first speed forward. As the hand lever is moved from notch 22 to 23, the following three operations occur:

1. Shaft 34 carrying gear 138 at its lower end turns, through gear 140, rotary valve member 141 (Figs. 6 to 14) to a position wherein one of apertures 200 is aligned with duct 148, thus moving piston 131 to the left and disengaging the clutch;

2. Driving gear 38 and driven gear 41 move lever 72 to cause the clutch 81 for first speed to be actuated;

3. Gears 138 and 140 associated with valve 137 cause the clutch to become re-engaged.

When hand lever 30 is at neutral position 22 on dial 21, gears 38 and 41 are also in the position of neutral, such position of gear 38 relative to gear 41 being indicated by broken lines 218 and 219 which are in alignment (Fig. 16). At spaced intervals along the convexly curved beveled edge of driving gear 38 there are formed a plurality of teeth. Teeth 220 are for actuating lever 72 for moving the clutch into first speed, 221 for reverse, 222 for second speed and 223 for third speed. When the transmission gears are changed from neutral to first or neutral to reverse, only one clutch lever is actuated in each instance and accordingly only two teeth are provided in gear 38 therefor. From first to second, however, it is necessary to actuate lever 72 to disengage the clutch from first speed and to actuate lever 73 to engage the appropriate clutch for second speed. The same is true in the change from second to third. Accordingly, double the number, or four teeth, are provided at 222 and 223.

Between the several groups of teeth there are smooth convex areas 226, 227 and 228. Driven gear 41 is formed with a plurality of spaced concave surfaces 230, 231, 232 and 233 and between areas 230 and 233 are teeth 236 which are driven by teeth 221 when reverse lever 75 is actuated. Between areas 230 and 231 are teeth 237 which are engaged and driven by teeth 220 to actuate lever operating clutch for first speed. Teeth 238 and 239, respectively, when driven by teeth 222 and 223, actuate clutch levers 73 and 74 for second and third speeds.

When hand lever 30 is moved from 22 to 23 on dial 21, gear 38 is thereby moved to a point wherein broken line 241 will coincide with line 219 on gear 41 in its position shown in Fig. 16. During the initial part of the movement, the valve is actuated to cause piston 131 to move to the left, thus disengaging the main clutch. Further movement causes teeth 220 to engage teeth 237 which imparts a partial turn to shafts 44 and 46, thus actuating clutch lever 72 and causing clutch member 81 to engage clutch member 88. Continued movement produces further rotation of the valve thus allowing main clutch to become re-engaged and when hand lever stops at notch 23, broken line 241 on gear 38 coincides with line 219 on gear 41 while it occupies the position shown. From the foregoing explanation the action of continued movement of hand lever 30 is obvious.

If desired, the valve structure could be modified by imparting intermittent, rather than continuous, movement thereto, and in such case an intermittent driving or Geneva gear, such as gear 38, would be employed.

The transmission described so far is of the progressive type; Figs. 18 and 19 will show the mechanism which enables it to function as a selective transmission as well. As hand lever 30 is moved about dial 21, it successively causes the appropriate gears for first, second and third speeds to become engaged for operation. This is accomplished by a revolution of shafts 46 and 44 carrying respectively, a plurality of male and female cams 116 and 114, as already disclosed. It is quite apparent that if it is desired to shift from neutral to third speed, this can be readily accomplished by rendering inoperative the respective male cams 116 and 116′ used to actuate levers 72 and 73, respectively, for first and second speeds, by lowering or raising these cams on their shaft 46 as hand lever 30 is being moved from neutral to third speed position. Accordingly, the male portions 117 of these cams do not engage rollers 111 on the levers of first and second speed. Likewise, if the shift is from neutral to second only, cam 116 of first speed is lowered.

Hand lever 30 (Fig. 18) is pivotally mounted at 250 on a collar 251 at the upper end of sleeve 34, a flat spring 252 normally urging the lever 30 upwardly. The dial 21 is formed with two substantially T shaped radially disposed apertures 254 and 255 which are positioned opposite notches 23 and 24 of first and second speeds, respectively. Within apertures 254 and 255, respectively, levers 256 and 257 are pivotally mounted at 258. The pivotal mounting may be formed by downwardly depending portions 260 which are formed integrally with the walls of the apertures or they may be separate brackets suitably secured to the lower surface of dial 21.

The transverse portion of each lever 256 and 257 is raised and is somewhat rounded as shown at 262. Lever 30 is formed with an offset portion 264 carrying a roller 265 adapted to engage one or the other or both of said raised portions 262 of levers 256 and 257, such raised portions projecting only slightly above dial 21. In this manner, the outer ends of levers 256 and 257 are depressed, thereby raising their opposite ends. A wire 266 is secured to such opposite end of lever 256 for skipping first speed and a wire 267 is secured to the end of lever 257 for skipping second speed, such wires passing over suitable guide pulleys 268 and through an aperture 269 in upper wall 14 of casing 10.

A downwardly depending portion 271 supports a pair of spaced, substantially centrally pivoted levers 273 and 274, to the outer ends of which wires 266 and 267, respectively are secured. These levers carry rollers 276 at their inner ends which engage cams 116 and 116′, respectively. These cams are suitably keyed to shaft 46 by means not shown, the means also permitting longitudinal movement of the cams relative to the shaft. Upward movement of cam 116 is limited by fixed collar 278 and a spring 279 carried on shaft 46 rests at its lower end against a fixed collar 281 (Fig. 7). Cam 116′ for second speed is provided with a spring 283 therebeneath, such spring resting at its lower end against a fixed collar 284. Upward movement of cam 116′ is limited by means of collar 281.

It will accordingly be seen that when it is desired to skip first speed and go directly from neutral to second speed, hand lever 30 is depressed as it comes adjacent to notch 23, thereby causing roller 265 to engage curved portion 262 of lever 256. Thus wire 266 is raised and lever 273 is depressed, as shown in Fig. 18.

In order to prevent clashing as cams 116 and 116′ are returned to their normal position, these cams may be formed with a smaller diameter than female cams 114, except, of course, that the male portions 117 must be of suitable length.

In skipping speed one and/or speed two, it is necessary that the clutch be kept continuously disengaged until the skipping has been effected. This is accomplished by diverting the stream of oil from left side of piston 131 so that this member does not return to the right and consequently does not allow clutch to become engaged until the proper time. For this purpose duct 149 is provided with a conventional two-way valve structure 290 (Fig. 6) which in normal position permits oil from valve structure 137 to reach and strike left terminal of piston 131, thus causing the clutch to become disengaged. When one or both of first and second speeds are to be skipped, wires 266 and 277 which operate levers 273 and 274, also are connected with lever 291 to turn this two-way valve structure and to divert the oil back to the crankcase instead of permitting it to reach left side of the piston 131. Wires 266 and 267 terminate at lever 292.

It should be remarked that even if auxiliary valve 290 is left out, the clutch is not apt to become re-engaged when either one or both of speed one and speed two are skipped, that is when the transmission is used in a selective manner, because, while left hand side 146 of piston 131 may reach place E, or even D, it will not manage to go to the right because the speed of moving hand lever 30 will exceed considerably the speed of piston 131 in its attempt to move to the right. Hence, the clutch is not apt to advance appreciably on its way back to the "engaged" position.

Returning to Fig. 3 it will be noticed that dial 21 is somewhat larger in diameter between neutral position 22 and reverse position 26, such portion being indicated at 297. The dial is formed in this manner in order to reduce the chances of accidental movement of lever 30 into reverse position, when returning from any direct drive position to neutral.

It will be noted that shaft 155 which actuates cam 162 is a relatively long member. It is necessary that this shaft be made as long as structurally possible, since it must overcome the resistance of the springs of the main clutch.

It will be apparent that many changes and modifications may be made in the apparatus illustrated and described without departing from the spirit of the invention as defined by the appended claims. For instance, the control shaft carrying hand lever 30 may be positioned at a point spaced from the steering wheel shaft. Also, the clutch members 81 and 88 on the speed transmission shafts may be varied in any manner known in the art.

While my invention is primarily intended to make use of the clutch-control mechanism above described in conjunction with the transmission proper, it is perfectly possible to dispense with this clutch-control mechanism and use only the transmission as described, or modified, in conjunction with an ordinary clutch foot pedal.

What I claim is:

1. A multiple speed transmission system comprising, in combination, a drive shaft adapted to be rotated by a prime mover, a driven shaft, a plurality of gear means adapted to connect drive shaft with driven shaft and turn the latter at varying speeds and in reverse speed, individual clutch means for selectively rendering one of said gear means operative, and a main clutch normally connecting the prime mover with the drive shaft, a control shaft, a manually actuated lever carried thereby, and means whereby rotation of said shaft through an arc will successively disengage the main clutch, actuate the desired individual clutch means and then re-engage the main clutch, said means including an intermittent driving gear carried by the control shaft adapted to actuate the individual clutch means after the disengagement of the main clutch, a driven shaft carrying an intermittent driven gear, a plurality of cams carried by such shaft, a plurality of individual clutch operating levers adapted to be successively actuated by said cams as the latter shaft is intermittently rotated, one of such levers being adapted to connect drive shaft directly with the driven shaft.

2. In a multiple speed transmission device having a drive shaft adapted to be rotated by a motor, a driven shaft, a plurality of individually actuated gear means adapted to connect drive shaft with driven shaft and turn the latter at varying speeds including a reverse drive and a main clutch normally connecting the motor with the drive shaft, the combination of means for successively disengaging the main clutch, actuating one of the individual gear means and then re-engaging the main clutch, said means comprising a manually actuated control shaft, a reciprocating piston, an eccentric cam normally engaging said main clutch, means connecting said cam with the piston to disengage the main clutch when the piston moves in one direction, means for retaining the clutch in a stable, disengaged position while the gear means are being actuated, means for delaying the return movement of the piston until the gear means have been actuated, and means associated with the control shaft for actuating the desired gear means during such interval.

3. In a multiple speed transmission device having a drive shaft adapted to be rotated by a motor, a driven shaft, a plurality of individually actuated gear means adapted to connect drive shaft with driven shaft and turn the latter at varying speeds including a reverse drive and a clutch device normally connecting the motor with the drive shaft, the combination of means for successively disengaging the clutch device, actuating one of the individual gear means and then re-engaging the main clutch, said means comprising a manually actuated control shaft, a cylinder having ports at opposite ends thereof, a reciprocating piston mounted within said cylinder and adapted to be moved by fluid pressure, an eccentric cam normally engaging said clutch at the low point of said cam, means connecting said cam with the piston to disengage the clutch when the piston moves in one direction, means for rotating the cam beyond its high point for retaining the clutch in a stable, disengaged position while the gear means are being actuated, means for delaying the return movement of the piston until the gear means have been actuated, and means associated with the control shaft for actuating the desired gear means during such interval.

4. In a multiple speed transmission device having a drive shaft adapted to be rotated by a motor, a driven shaft, a plurality of individual gear means adapted to connect drive shaft with driven shaft and turn the latter at varying speeds, and a main clutch normally connecting the motor with the drive shaft and adapted to interrupt such drive during actuation of one of the individual clutch means, the combination of a control shaft, a hand lever carried thereby, and means whereby movement of said shaft through an arc will successively disengage the main clutch, actuate the selected clutch means and then permit the main clutch to become re-engaged, said means comprising a reciprocating member operatively connected with the main clutch to disengage it from drive shaft when moved in one direction and re-engage it when moved in the opposite direction, means controllable by the control shaft for moving said member through a cycle, and an intermittent gear carried by the control shaft adapted to actuate the individual clutch means at the end of the first stroke of the piston and prior to its beginning its return stroke and means for rendering any one of said gear means inoperative while changing from one speed to another.

5. A multiple speed transmission system comprising, in combination, a driving shaft adapted to be rotated by a prime mover, a driven shaft, a plurality of gear means adapted to connect drive shaft with driven shaft and turn the latter at varying forward speeds and in reverse drive, individual clutch means for selectively rendering one of said gear means operative and including a clutch means for effecting a direct connection between driving shaft and driven shaft, and a main clutch normally connecting the prime mover with the driving shaft, a control shaft, a manually actuated lever carried thereby, and means whereby rotation of said lever through an arc will successively disengage the main clutch, actuate the desired individual clutch means and then re-engage the main clutch, said means including a driving gear formed with interrupted teeth carried by control shaft adapted to actuate the individual clutch means after the main clutch is disengaged, a plurality of shafts adapted to be rotated by said driving gear, a plurality of sets of complemental cams carried by such shafts, and a plurality of individual clutch-operating levers adapted to be successively actuated by said cams as the latter shafts are intermittently rotated.

6. A multiple speed transmission system comprising, in combination, a driving shaft adapted to be rotated by a prime mover, a driven shaft, a plurality of gear trains connecting drive shaft with driven shaft and turning the latter at varying forward speeds and in reverse drive, individual clutch means for selectively rendering one of said gear trains operative, including a direct connection between driving and driven shaft, and a main clutch normally connecting the prime mover with the driving shaft, a manually revolvable control lever, and means whereby rotation of said lever through an arc will successively disengage the main clutch, actuate the desired individual clutch means and then re-engage the main clutch, said means including a Geneva driving gear carried by a control shaft adapted to actuate the individual clutch means after the disengagement of the main clutch, a driven shaft carrying a Geneva driven gear, a plurality of cams carried by such shaft, and a plurality of individual clutch operating levers adapted to be successively actuated by said cams as the latter shaft is intermittently rotated.

7. A multiple speed transmission system comprising, in combination, a drive shaft adapted to be rotated by a prime mover, a driven shaft, a plurality of gear trains connecting drive shaft with driven shaft and turning the latter at varying forward speeds and in reverse drive, individual clutch means for selectively rendering one of said gear trains operative, and a main clutch normally connecting the prime mover with the drive shaft, a manually revolvable control shaft, and means whereby rotation of said shaft through an arc will successively disengage the main clutch, actuate the desired individual clutch means and then re-engage the main clutch, said means including a plurality of driving gears carried by the control shaft adapted to disengage the main clutch and then actuate the individual clutch means, said clutch disengaging means comprising a cylinder, a piston within the cylinder, fluid means controllable by one of said driving gears adapted to move said piston through a cycle from one end of the cylinder to the other, a pivoted cam connected with said piston and engaging the main clutch, said cam adapted to disengage said main clutch when rotated in one direction by the piston, and means for momentarily maintaining the cam against displacement while the clutch is disengaged, and fluid control means for regulating the gradual return of the clutch to the engaged position.

8. A multiple speed transmission system comprising, in combination, a driving shaft rotated by a prime mover, a driven shaft, a plurality of gear trains adapted to connect drive shaft with driven shaft and turn the latter at varying forward speeds and in reverse drive, individual clutch means for selectively rendering one of said gear trains operative, and a main clutch normally connecting the prime mover with the drive shaft, a control shaft, a manually actuated lever carried thereby, and means whereby rotation of said lever through an arc will successively disengage the main clutch and holding it disengaged during the period of speed-establishing-clutch shifting, actuate the desired individual clutch means and then re-engage the main clutch, said means including a thrust bearing associated with the main clutch, a circular cam formed with a flat side normally engaging the thrust bearing, and fluid actuated means for rotating the cam to cause the circular part of its periphery to engage the bearing and disengage the main clutch, and a driving gear rotatable by the control shaft to actuate the individual clutch means after the main clutch is disengaged.

9. A multiple speed transmission system comprising, in combination, a driving shaft rotated by a prime mover, a driven shaft, a plurality of gear trains adapted to connected drive shaft with driven shaft and turn the latter at varying forward speeds and in reverse drive, individual clutches for selectively rendering one of said gear trains operative and including a clutch for effecting a direct connection between driving shaft and driven shaft, and a main clutch normally connecting the prime mover with the drive shaft, a manually rotatable control shaft, and means whereby rotation of said shaft will successively disengage the main clutch, actuate the desired individual clutch and then re-engage the main clutch, said means including a driving gear formed with interrupted teeth carried by the control shaft adapted to actuate the individual clutch means after the main clutch is disengaged, a plurality of shafts adapted to be rotated by said driving gear, cams carried by such shafts, a plurality of individual clutch-operating levers selectively actuated by said cams as the latter shafts are intermittently rotated, and means for rendering any cam inoperative during rotation of the control shaft to interrupt the normal cycle of operation through successive speeds.

10. In a multiple speed transmission device having a drive shaft adapted to be rotated by a motor, a driven shaft, a plurality of individually actuated gear means adapted to connect drive shaft with driven shaft and turn the latter at varying forward speeds and also in a reverse drive and a main clutch normally connecting the motor with the drive shaft, the combination of means for successively disengaging the main clutch, actuating one of the individual gear means and then re-engaging the main clutch, said means comprising a manually actuated control shaft, a cylinder, a reciprocating piston positioned therein, fluid means controllable by the control shaft for moving the piston, a thrust bearing associated with the clutch, an eccentric cam normally contacting the thrust bearing, said cam presenting a flattened, low portion resting against said thrust bearing when the clutch is engaged and a high, circular portion intended to rest against that member when the clutch is disengaged, means connecting the piston with said cam to rotate the latter, bring said circular, high portion against said thrust bearing and disengage the clutch when the piston moves in one direction, the piston having a sufficient stroke to rotate the cam beyond the point of contact of its flattened, low portion with the thrust bearing, this resulting in retaining the clutch in a stable, disengaged position while the gear means are being actuated, means for delaying the return movement of the piston until the gear means have been actuated, and means associated with the control shaft for actuating the desired gear means during such interval.

11. A multiple speed transmission system for a motor driven vehicle comprising, in combination, a drive shaft rotated by a prime mover, a driven shaft, a plurality of gear means adapted to connect drive shaft with driven shaft and turn the latter at varying speeds and in reverse drive, individual clutch means for selectively rendering one of said gear means operative, and a main clutch normally connecting the prime mover with the drive shaft, a control shaft, a manually actuated lever carried by said control shaft and movable in a plane substantially parallel with the plane of the steering wheel, and means whereby rotation of said shaft through an arc will successively disengage the main clutch, actuate the desired individual clutch means and then re-engage the main clutch, said means including an intermittent driving gear carried by the control shaft adapted to actuate the individual clutch means after the disengagement of the main clutch, a driven shaft carrying an intermittent driven gear, a plurality of cams carried by such shaft, a plurality of individual clutch-operating levers adapted to be successively actuated by said cams as the latter driven shaft is intermittently rotated, one of such levers being adapted to connect the drive shaft directly with the driven shaft.

12. In a multiple speed transmission device including a drive shaft adapted to be rotated by a motor, a driven shaft, a plurality of individually actuated gear means adapted to connect drive shaft with driven shaft and turn the latter at varying forward speeds and also in a reverse drive and a main clutch for connecting the motor with the drive shaft, the combination of means for successively disengaging the main clutch, actuating one of the individual gear means and then re-engaging the main clutch, said means comprising a manually actuated control shaft, a cylinder having ports at opposite ends thereof, a reciprocating piston mounted within said cylinder, a source of pressure for moving said piston in one direction and in the other direction, a thrust bearing positioned concentrically of the drive shaft and being operatively connected with the main clutch, an eccentric cam engaging said thrust bearing at the low point of the cam, a rod connecting said cam with the piston to disengage the clutch when the piston moves in one direction, means for continuing rotation of the cam after its high point engages the thrust bearing for retaining the clutch in a stable, disengaged position while the gear means are being actuated, means for delaying the return movement of the piston until the gear means have been actuated, and means associated with the control shaft for actuating the desired gear means during such interval.

13. A multiple speed transmission system for a motor driven vehicle comprising, in combination, a driving shaft rotated by a prime mover, a driven shaft, a plurality of gear means adapted to connect drive shaft with driven shaft and turn the latter at varying forward speeds and in a reverse drive, individual clutch means for selectively rendering one of said gear means operative and including a clutch means for effecting a direct connection between driving shaft and driven shaft, and a main clutch normally connecting the prime mover with the drive shaft, a control shaft, a manually actuated lever carried thereby and being rotatable on a plane adjacent to and substantially parallel with the steering wheel of the vehicle, and means whereby rotation of said lever through an arc will successively disengage the main clutch, actuate the desired individual clutch means and then re-engage the main clutch, said means including a driving gear formed with interrupted teeth carried by control shaft adapted to actuate the individual clutch means after the main clutch is disengaged, a pair of shafts intermittently rotatable by said driving gear, complemental male and female cams carried by said shafts, and a clutch-operating lever actuated by each pair of cams as said shafts are rotated, the male and female portions of each set of cams holding said lever immovable during periods of activity of the individual clutch means controlled thereby.

14. A multiple speed transmission system for a motor driven vehicle comprising, in combination, a driving shaft rotated by a prime mover, a driven shaft, a plurality of gear means adapted to connect drive shaft with driven shaft and turn the latter at varying speeds and including reverse drive, individual clutch means for selectively rendering one of said gear means operative and including a clutch means for effecting a direct connection between driving shaft and driven shaft, and a main clutch normally connecting the prime mover with the drive shaft, a control shaft, a manually actuated lever carried thereby and being rotatable on a plane adjacent to and substantially parallel with the steering wheel of the vehicle, and means whereby rotation of said lever through an arc will successively disengage the main clutch, actuate the desired individual clutch means and then re-engage the main clutch, said means including a driving gear formed with interrupted teeth carried by the control shaft adapted to actuate the individual clutch means after the main clutch is disengaged, a shaft intermittently rotatable by said driving gear, a plurality of cams formed with complemental male and female portions carried by said shaft, and a plurality of individual clutch-operating levers adapted to be successively actuated by said cams as the latter shaft is intermittently rotated, the male and female portions of each cam holding one of said levers immovable during periods of activity of the individual clutch means controlled thereby.

15. A multiple speed transmission system comprising, in combination, a drive shaft rotated by a prime mover, a driven shaft, a plurality of gear trains connecting drive shaft with driven shaft and turning the latter at varying forward speeds and in reverse drive, individual clutch means for selectively rendering one of said gear trains operative, and a main clutch normally connecting the prime mover with the drive shaft, a manually revolvable control shaft, and means whereby rotation of said shaft through an arc will successively actuate the main clutch-disengaging means, then actuate the desired individual clutch means and then actuate the main-clutch re-engaging means, said means including a plurality of driving gears carried by the control shaft adapted to disengage the main clutch and then actuate the individual clutch means, said clutch-disengaging means comprising a cylinder, a piston within the cylinder, a rotary valve structure including a valve member having a plurality of ports and being rotated by one of said driving gears, fluid means controllable by said valve member for positively moving said piston through a cycle from one end of the cylinder to the other, a pivoted cam connected with said piston and engaging the main clutch, said cam adapted to disengage said main clutch when rotated in one direction by the piston, means for momentarily maintaining the cam against displacement while the clutch is disengaged, and fluid control means associated with one of the ports of the valve member for retarding the return of the piston and thus delaying the return of the clutch to the engaged position.

16. A multiple speed transmission system for a motor driven vehicle comprising, in combination, a driving shaft rotated by a prime mover, a driven shaft, a plurality of gear means adapted to connect drive shaft with driven shaft and turn the latter at varying forward speeds and in a reverse drive, individual clutch means for selectively rendering one of said gear means operative and including a clutch means for effecting a direct connection between driving shaft and driven shaft, and a main clutch normally connecting the prime mover with the drive shaft, a control shaft, a manually actuated lever carried thereby and being rotatable on a plane adjacent to and substantially parallel with the steering wheel of the vehicle, a depressible member carried by the lever, and means whereby rotation of said lever through an arc will successively disengage the main clutch, actuate the desired individual clutch means and then re-engage the main clutch, said means including an intermittent driving gear carried by the control shaft adapted to actuate the individual clutch means after the main clutch is disengaged, a plurality of shafts intermittently rotatable by said driving gear, a cam element carried by each shaft, a clutch-operating lever operatively connected with each individual clutch means associated with the several gear means, each clutch-operating lever being movable to operative and to inoperative position by one of said cam elements through rotation of the intermittent driving gear, means for selectively rendering one of said cam elements inoperative during rotation of the intermittent driving gear comprising a control element leading from said cam element to a point adjacent to the depressible member carried by the control lever, whereby movement of the extension will cause movement of the control element and render the selected cam element inoperative.

17. A multiple speed transmission system comprising, in combination, a driving shaft rotated by a prime mover, a driven shaft, a plurality of gear trains adapted to connect drive shaft with driven shaft and turn the latter at varying forward speeds and in reverse drive, individual clutches for selectively rendering one of said gear trains operative and including a clutch for effecting a direct connection between driving shaft and driven shaft, and a main clutch normally connecting the prime mover with the drive shaft, a control shaft, a manual lever carried thereby, and means whereby rotation of said shaft will successively disengage the main clutch, actuate the desired individual clutch and then re-engage the main clutch, said means including an intermittent driving gear carried by the control shaft adapted to actuate the individual clutch means after the main clutch is disengaged, a plurality of shafts adapted to be rotated by said driving gear, cams carried by such shafts, a plurality of individual clutch-operating levers selectively actuated by said cams as the latter shafts are intermittently rotated, and means for selectively rendering one of the cams inoperative during rotation of the control shaft to interrupt the normal cycle of operation through successive speeds, said means comprising a depressible member carried on the manual lever mounted on the control shaft, a dial positioned adjacent to said lever and a plurality of spaced, depressible elements mounted on the dial, a control rod connecting each depressible element with a corresponding cam, whereby manual movement of said depressible member will move a selected depressible element and render the corresponding cam inoperative.

18. A multiple speed transmission system comprising, in combination, a drive shaft adapted to be rotated by a prime mover, a driven shaft, a plurality of gear means adapted to connect drive shaft with driven shaft and turn the latter at varying forward speeds and also in a reverse drive, individual clutch means for selectively rendering one of said gear means operative, each of said clutch means comprising a plurality of interengaging clutch elements formed with alternate long and short teeth, and a main clutch normally connecting the prime mover with the drive shaft, a control shaft, a manually actuated lever carried thereby, and means whereby rotation of said shaft through an arc will successively disengage the main clutch, actuate the desired individual clutch means and then re-engage the main clutch, said means including an intermittent driving gear carried by control shaft adapted to actuate the individual clutch means after the disengagement of the main clutch, a driven shaft carrying an intermittent driven gear, a plurality of cams carried by such shaft, a plurality of individual clutch-operating levers adapted to be successively actuated by said cams as the latter shaft is intermittently rotated, one of such levers being adapted to connect drive shaft directly with the driven shaft.

19. A multiple speed transmission system comprising, in combination, a driving shaft adapted to be rotated by a prime mover, a driven shaft, a plurality of gear means adapted to connect drive shaft with driven shaft and turn the latter at varying forward speeds and in reverse drive, individual clutch means for selectively rendering one of said gear means operative and including a clutch means for effecting a direct connection between driving shaft and driven shaft, each of such clutch means including a pair of clutch elements comprising interengaging gears mounted in axial alignment and formed with alternate long and short teeth, and a main clutch normally connecting the prime mover with the drive shaft, a control shaft, a manually actuated lever carried thereby, and means whereby rotation of said lever through an arc will successively disengage the main clutch, actuate the desired individual clutch means and then re-engage the main clutch, said means including a driving gear formed with interrupted teeth carried by control shaft adapted to actuate the individual clutch means after the main clutch is disengaged, a plurality of shafts adapted to be rotated by said driving gear, a plurality of sets of complemental cams carried by such shafts, and a plurality of individual clutch-operating levers adapted to be successively actuated by said cams as the latter shafts are intermittently rotated.

ISAAC B. HOROWITZ.